US006812433B1

(12) United States Patent
Barritt

(10) Patent No.: US 6,812,433 B1
(45) Date of Patent: Nov. 2, 2004

(54) NO PREHEAT SYSTEM FOR A COOKING APPLIANCE

(75) Inventor: William D. Barritt, Cleveland, TN (US)

(73) Assignee: Maytag Corporation, Newton, IA (US)

(*) Notice: Subject to any disclaimer, the term of this patent is extended or adjusted under 35 U.S.C. 154(b) by 0 days.

(21) Appl. No.: 10/728,837

(22) Filed: Dec. 8, 2003

(51) Int. Cl.[7] .............................. H05B 1/02; A21B 1/40

(52) U.S. Cl. ........................ 219/413; 219/412; 219/492

(58) Field of Search ......................... 219/413, 483–486, 219/492

(56) References Cited

U.S. PATENT DOCUMENTS

| | | | | |
|---|---|---|---|---|
| 4,164,643 | A | 8/1979 | Peart et al. | |
| 4,757,181 | A | 7/1988 | Sakamoto et al. | |
| 4,927,998 | A | 5/1990 | Tamura et al. | |
| 5,272,299 | A | 12/1993 | Ovadia | |
| 5,428,206 | A | 6/1995 | Uchida et al. | |
| 5,432,321 | A | 7/1995 | Gerl | |
| 5,676,870 | A | 10/1997 | Wassman et al. | |
| 5,910,264 | A | 6/1999 | Dauliach | |
| 6,114,664 | A | 9/2000 | Cook et al. | |
| 2004/0099656 | A1 * | 5/2004 | Sauter | 219/492 |

FOREIGN PATENT DOCUMENTS

| | | | |
|---|---|---|---|
| JP | 62052324 | A * | 3/1987 |

* cited by examiner

*Primary Examiner*—J. Pelham
(74) *Attorney, Agent, or Firm*—Diederiks & Whitelaw, PLC

(57) ABSTRACT

A control system for a cooking appliance enables a consumer to perform a complete cooking operation regardless of whether food is placed into an oven after a preheating operation or without initially preheating the oven. When the consumer does not intend to allow the oven to be preheated prior to inserting the food to be cooked therein, the consumer can select a no preheat operation wherein the lack of preheating is automatically compensated for, preferably by causing the oven to perform the cooking operation in two stages. Initially, the oven is operated at full output capacity for a first predetermined period and thereafter operated at various heat outputs during a subsequent plurality of stages until the cooking operation is complete. In this manner the food is completely cooked without the need to add additional time to the overall cooking operation.

26 Claims, 3 Drawing Sheets

NO PREHEAT SYSTEM FOR A COOKING APPLIANCE

BACKGROUND OF THE INVENTION

1. Field of the Invention

The present invention pertains to the art of cooking appliances and, more particularly, to a control system for a cooking appliance which enables the appliance to perform a cooking operation without an initial preheat period.

2. Discussion of the Prior Art

Conventional cooking appliances generally perform cooking operations through radiant heat developed from bake and/or broil heating elements. Such types of cooking appliances can take various forms, mainly ranges and wall ovens. When utilizing a conventional cooking appliance, the oven is initially controlled to proceed through a preheat cycle in order to establish a desired cooking temperature. Oftentimes, a signal is provided to a user when the preheat cycle is complete in order to indicate when the food to be cooked should be placed in the oven. In some cases, both the bake and the broil elements are actuated during the preheat cycle. The oven preheat is typically required for short cook time items, such as packaged food items e.g. frozen pizza and TV dinners, as well as baked goods such as cookies, biscuits and the like.

Since their introduction, packaged food products have grown in popularity with modem consumers. Most, if not all, packaged food items have imprinted upon their labels preparation instructions that include time and temperature parameters. Typically, the preparation instructions also include an oven preheat requirement. That is, prior to placing the packaged food item into a cooking chamber of an oven, that oven must be preheated according to the preparation instructions. Generally, the preheat takes in the order of 10–15 minutes to bring the cooking chamber to or near a desired temperature. Therefore, in order to determine an overall preparation time, a consumer must add the preheat time to the actual cook time. Likewise, recipes for baked goods and other short cook time items establish cook time parameters based upon the oven being preheated.

Since cooking times set forth in recipes or other cooking instructions are established based on an oven being preheated, failure to preheat the oven directly affects the overall food preparation. Under such circumstances, the user must either mentally determine a supplemental cooking time period for the food item or, if the cook time is not altered, the food will be at least slightly undercooked. Thus, the consumer must take into account the preheat time of the oven when preparing a meal. However, due to haste, busy schedules or other time constraints, this additional time is not always allotted and, therefore, the consumer is faced with either consuming a partially undercooked meal or continually checking to see when the food item has cooked completely. In any case, unless the oven is preheated, the food item is not cooked in a satisfactory manner within the established time parameter.

Based on the above, there exists a need in the art for a system that will enable a consumer to readily perform a cooking operation within established time parameters without requiring that the oven be initially preheated. In other words, under conditions wherein a cooking operation is to be performed, it would be beneficial to enable the consumer to easily perform a cooking operation that automatically compensates for the lack of a preheat cycle while, at the same time, not extending the established time parameter.

SUMMARY OF THE INVENTION

The present invention is directed to a control system for a cooking appliance which enables a consumer to selectively perform a complete cooking operation in a standard mode or in a no preheat mode. More specifically, in the no preheat mode, the control system modifies operation of the oven so that the cooking operation is completed, despite placing a food item in a cold oven, within established time parameters, i.e., within a time period specified in on package label or as set forth in a recipe. The present invention is particularly adapted for use in connection with short cook time items, such as frozen pizzas, cookies, biscuits and the like, rather then long term items, such as roasts.

In accordance with the most preferred embodiment of the present invention, when the no preheat mode is selected, the cooking operation is performed using a two-stage process. Initially, the control system operates one or more heat sources at a maximum heat output for a first predetermined period. At the termination of a first period, the control system operates the heat source(s) at varying heat output levels for a second predetermined period. Preferably, the second period includes a plurality of stages, between which the operation and heat output of the heat source(s) is adjusted so as to match a level of heat capable of being absorbed by the food item. In this manner, the control system can complete the cooking operation within established time parameters without requiring the oven to be initially preheated.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
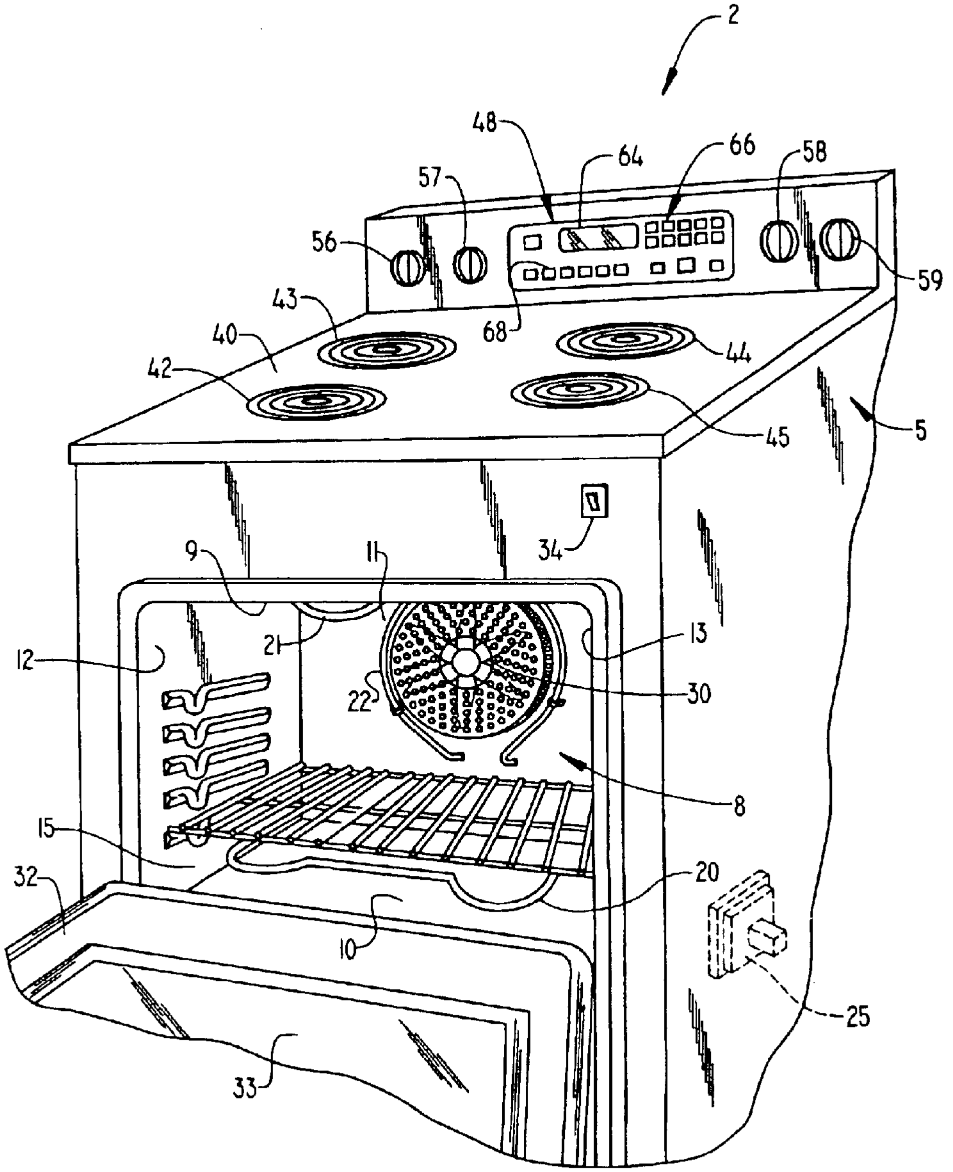
FIG. 1 is a partial perspective view of an electric range incorporating a no preheat cooking system according to the invention.

With initial reference to FIG. 1, the invention is illustrated for use in connection with an electric range, generally indicated at 2. In the embodiment shown, electric range 2 includes a cabinet 5 within which is arranged an oven cavity 8 having top, bottom, rear and opposing side walls 9–13 that collectively define a cooking chamber 15. Cooking chamber 15 has associated therewith a plurality of heat sources positioned to elevate a temperature of cooking chamber 15 during a cooking operation. In the embodiment shown, cooking chamber 15 includes a lower heating or bake element 20, an upper heating or broil element 21, a convection heating element 22 and a microwave emitter or magnetron 25. Convection element 22 has associated therewith a convection fan 30 that, upon activation, circulates a heated airflow about cooking chamber 15. Range 2 is also provided with a door 32, shown in an open condition wherein access to cooking chamber 15 is permitted. This figure also illustrates the presence of a viewing window 33 in door 32. In a manner known in the art, cabinet 5 is provided with a light switch 34 which functions to turn on a light (not shown in FIG. 1 but indicated at 35 in FIG. 2) to illuminate cooking chamber 15 upon the opening of door 32.

Cabinet 5 is also provided with an associated range top 40 which supports various spaced surface heating elements 42–45 in a manner known in the art. At an upper rear portion, cabinet 5 is provided with a control panel 48. Control panel 48 includes a plurality of knobs 56–59 for use in selectively activating and deactivating surface heating elements 42–45 respectively. In addition, control panel 48 is shown to include a central display 64, such as an LED or LCD display unit (also see FIG. 2). Furthermore, control panel 48 is provided with a number pad, generally indicated at 66, having buttons for the numbers zero (0) through nine (9), with the zero (0) button also functioning as a reset control button.

Although the particular features incorporated into electric range 2 could vary greatly within the scope of the present invention, for the sake of completeness in describing a preferred form of the invention, control panel 48 of range 2 is also shown to include a lower row of control buttons, generally indicated at 68, which are provided to select various operational modes for range 2. For instance, the row of control buttons 68 can be used to select bake, broil, microwave and clean modes for range 2 through respective buttons 69–72. In the particular embodiment shown, an additional convection baking mode, which is essentially defined by a baking mode with the further activation of convection fan 30, can be selected through button 73.

In another form of the invention, the user may program the operation of range 2 through the use of the lower row of control buttons 68, control button 73 and numeric pad 66, as well as timer buttons 75 and 76. Furthermore, buttons 78 and 79 are provided to enable a consumer to set desired countdown and clock times, in combination with numeric pad 66, respectively. Button 80 performs a stop or clear control function, while button 81 enables a consumer to turn on light 35 without opening door 32 such that cooking chamber 15 can be selectively viewed through window 33. Button 90 is provided to initiate the no preheat mode in accordance with this invention as will be described below. Finally, an Auto Set button 92 is provided and can be used to perform various programming functions as will also be discussed below. Of course, although various buttons are described for use on control panel 48, other types of control members, including a wide range of switches, could equally be employed. In addition, although the invention is being described with reference to range 2, it should be recognized that the invention is applicable to various types of cooking appliances, including wall ovens and the like.

Figure 2:
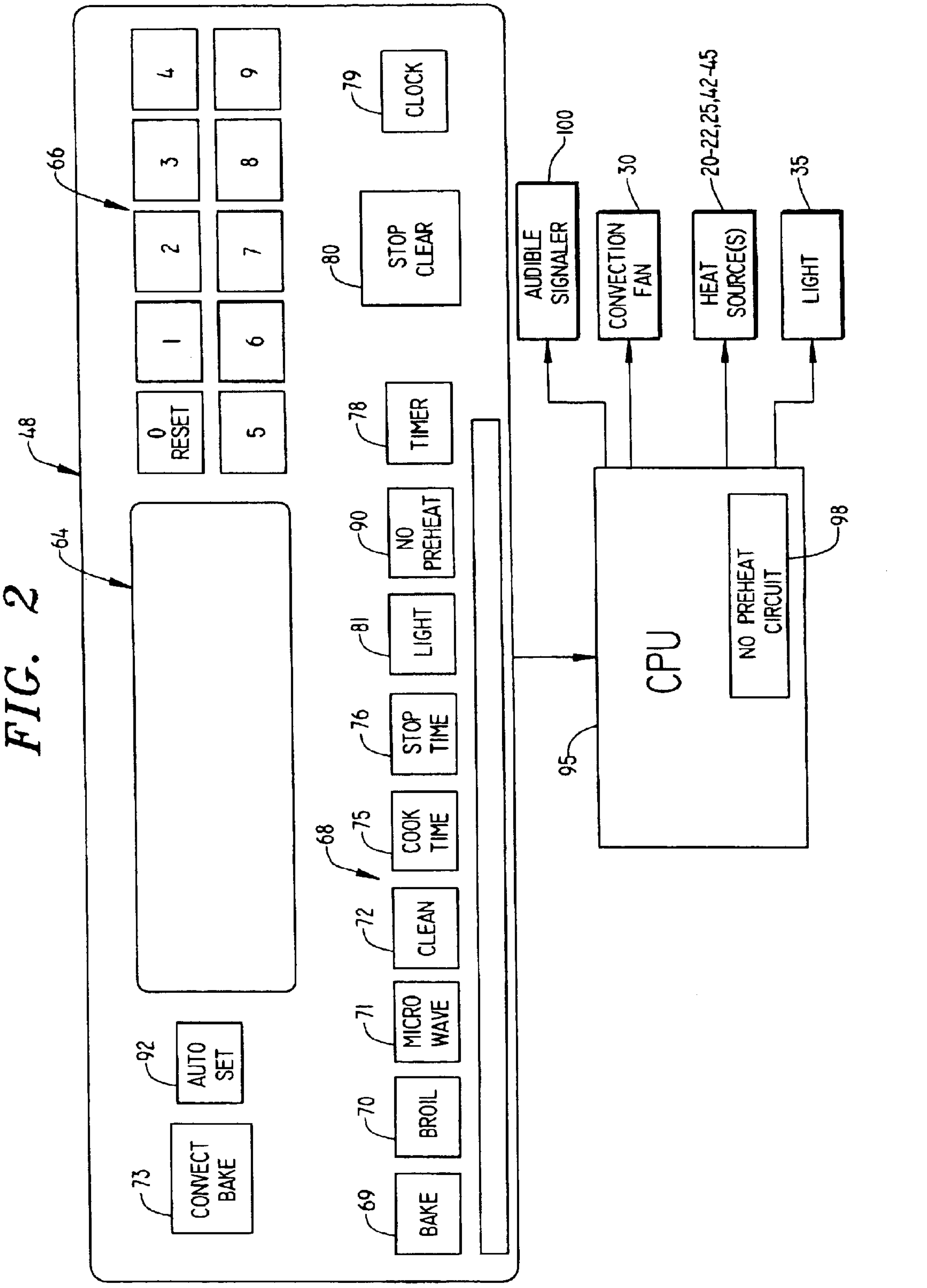
FIG. 2 is a front view of a control panel, forming part of the range shown in FIG. 1, including a schematic illustration of a control arrangement that forms part of the no preheat cooking system.

FIG. 2 shows control panel 48 including an associated CPU 95 for controlling fan 30 and heat sources 20–22, 25 and 42–45 of range 2. CPU 95 also includes a no preheat circuit 98 which is activated through no preheat selector button 90 as will be more fully discussed below. As the operation of light 35 and heating elements 42–45 is performed in a manner known in the art and does not constitute part of the present invention, they will not be discussed further here. However, it will be mentioned that Auto Set button 92 can be used to assist the user in programming a cooking operation for range 2. For example, if bake button 69 is selected, the operating temperature can be set directly through number pad 66 or by pressing Auto Set button 92 once for a certain starting temperature, e.g. 350° F. (177° C.), and subsequently for adding a set temperature value, e.g. 25° F. (14° C.), upon each further depression of button 92. If a broil operation is selected through button 70, Auto Set button 92 can be used to toggle between "Hi" and "Low" settings for heating element 21. In any event, this operation is known in the art and only provided for the sake of completeness. Instead, the present invention is particularly directed to the manner in which CPU 95 is programmed to cause heating of cooking chamber 15 upon the selection of the no preheat mode by a user through button 90. More particularly, no preheat circuit 98 of CPU 95 operates in accordance with the present invention to assure that a complete cooking operation is performed on a food item placed within cooking chamber 15 even though cooking chamber 15 is not initially preheated.

In using range 2, a consumer may select a desired cooking function or operational mode through control buttons 69–71 and 73, while also establishing an operating time period for the respective heat source(s) utilizing numeric pad 66 and timer buttons 75 and 76. Again, numeric pad 66 or Auto Set button 92 can be used to set certain operating parameters as well. In one embodiment, the selected operation will be shown by illuminating key words or symbols in central display 64. The preceding description corresponds to the structure described in U.S. Pat. No. 6,153,858, the entire disclosure of which is herein incorporated by reference.

It is preferable to employ some type of audible or visual indicator to the consumer when certain time periods have expired or certain temperatures have been reached. This function is performed by incorporating a piezoelectric buzzer or the like as indicated schematically in FIG. 2 at 100. For instance, as with a conventional cooking appliance, buzzer 100 is preferably used to indicate the end of a cooking operation. In addition, when range 2 is used in a more conventional mode wherein cooking chamber 15 is permitted to preheat prior to the placing of food therein for cooking, buzzer 100 can signal a user at the end of the preheat stage.

Of course, as indicated above, it is not uncommon for a consumer to place food into an oven for a predetermined cook time without first enabling the oven to reach a preheat temperature. Since cooking times set forth in recipes or other cooking instructions for short cook time items such as frozen pizzas, cookies, biscuits and the like, are established based on an oven being preheated, failure to preheat the oven directly affects the overall food preparation. However, in accordance with the present invention, the user need only press no preheat selector button 90 after programming a cooking operation wherein the user is not going to allow cooking chamber 15 to preheat. Therefore, a signal is sent to CPU 95 that no preheat circuit 98 is to be utilized in connection with the selected cooking operation. In general, when the no preheat mode is selected, the heat source(s) 20–22, 25 is operated in such a manner as to match heat input to cooking chamber 15 with a level of heat that the food item is capable of absorbing. No preheat circuit 98 incorporates a control algorithm which functions to determine the required heat output and cycles time parameters of each of the heat sources 20–22, 25 associated with cooking chamber 15. These parameters are then used to establish a particular cooking operation so as to completely cook the food item in the established time period. That is, in the case of a prepackaged food item, the food item will be completely cooked within the time period listed on the package label. In the case of a recipe, the food item will be completely cooked in the time period set forth in the recipe. In either case, the consumer can input the time period for cooking and either elect to wait for cooking chamber IS to be preheated before placing the food item therein for the set time period or activate no preheat control circuit 98 through button 90 to allow the food item to be immediately placed in cooking chamber 15 and fully cooked in the same time period.

Figure 3:
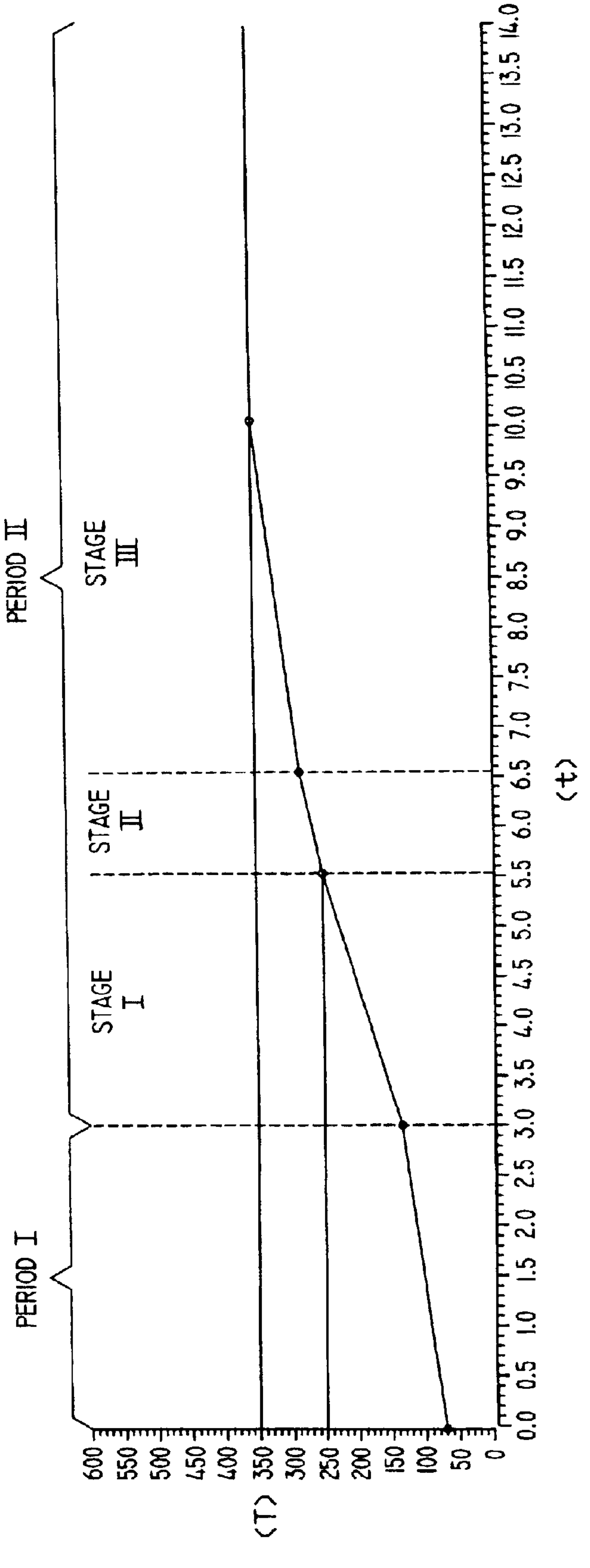
FIG. 3 is a graphical, linear interpolation representation illustrating various stages of operation of the no preheat system in accordance with the invention.

By way of an example as shown in FIG. 3, if biscuits are recommended to be cooked at 350° F. (177° C.) for 14 minutes and no preheat selector button 90 is pressed, the cooking operation enters a first period where CPU 95 would operate one or more of heat elements 20–22, perhaps even with fan 30 and/or microwave 25 heat sources, in a first or rapid heat mode during which time the heat sources are operated to produce as much heat as the oven can deliver. During this initial period, an insulation barrier, resulting from a temperature differential between the food item and oven ambient air, substantially prevents the food item from absorbing the heat. Thus, the oven can be operated at these high heat input levels without fear that the food item will be adversely affected. After a period of time, for example 3 minutes for the biscuits, the cooking operation enters a second period where CPU 95 controls the heat sources in a manner so as to produce a series of managed heat generation stages to prevent the food item from burning while the temperature of cooking chamber 15 is reaching package or recipe temperature. That is, the wattage output is adjusted during the managed heat generation stages to balance an amount of top and bottom heat both in radiated energy and ambient oven air temperature. For example, during an initial stage of the second period, CPU 95 operates bake element 20 at 50% power, e.g., either by operating bake element 20 at half of the available power level or at full power level for half the established time, broil element 21 at nearly 100% power and convection element 22 is off, for a period of approximately 2.5 minutes. In stage II, CPU 95 operates bake element 20 at nearly 100% power, broil element 22 is off and convection element 22 at approximately 20% power, for a period of approximately 1.0 minutes. Finally, in stage III, CPU 95 operates bake element 20 at approximately 95% power, while broil element 21 and convection element 22 are off, for a period of approximately 7.5 minutes during which time cooking chamber 15 reaches the set temperature. With this arrangement, at the completion of 14 minutes, the food item (biscuits) is completely cooked to the same level as if cooking chamber 15 was initially preheated.

The actual number of stages and adjustments made are dependent upon the physical limitations of the oven and the set temperature, but can be adjusted to work in any oven, preferably an oven having a required total energy availability according to the relationship A/B≅1270 Watts/ft$^3$, where A is the required minimum total wattage of heating elements in range 2 and B is the total volume of cooking chamber 15. In any event, at the termination of the managed heat generation stages, the food item is completely cooked within the predetermined or listed time parameters without preheating cooking chamber 15.

In any case, it should be understood that the present invention is focused on preparing short cook time items, for example frozen pizza, cookies and biscuits, with a no preheat mode of operation. The advantageous features of this invention do not necessarily lend themselves to long cook time items such as roasts, whole chickens and turkey which are not generally affected by failing to preheat the oven. Although described with reference to a preferred embodiment of the present invention, it should be readily apparent to one of ordinary skill in the art that various changes and/or modifications can be made to the invention without departing from the spirit thereof. In addition, the particular operation and cycling of the heating element(s) within each particular stage or managed heat generation step could vary based upon the physical limitation of the appliance. Also, the particular programming established through the control panel is but one example as the present invention would work equally as well with a wide array of control panels. Finally, it should be understood that the particular number and type of heating elements could vary in accordance with the present invention. In general, the invention is only intended to be limited to the scope of the following claims.

I claim:

1. A cooking appliance comprising:

an oven cavity including top, bottom, rear and side walls that collectively define a cooking chamber;

a door movably mounted relative to the oven cavity for selectively sealing the cooking chamber;

at least one heat source positioned to selectively direct heat into the cooking chamber to perform a cooking operation; and a control system selectively operable in each of a standard mode and a no preheat mode wherein, upon initiation of the no preheat mode, said control system activates the at least one heat source at a maximum heat output for a first predetermined period and at a varying heat output through a plurality of stages for a second time period.

2. The cooking appliance according to claim 1, wherein the plurality of stages are based upon total energy available in the oven cavity based on a relationship of A/B≅1270 Watts/ft$^3$, wherein A is a required minimum total wattage of the at least one heat source and B is a volume of the oven cavity.

3. The cooking appliance according to claim 1, wherein said at least one heat source comprises a plurality of heat sources, said plurality of heat sources including a radiant heat source, a convection heat source and microwave heat source.

4. The cooking appliance according to claim 3, wherein at least one of the plurality of heat sources is activated during each of the plurality of stages.

5. The cooking appliance according to claim 4, wherein at least two of the plurality of heat sources are activated during a majority of the plurality of stages.

6. The cooking appliance according to claim 1, wherein the at least one heat source includes an upper heating element and a lower heating element.

7. The cooking appliance according to claim 6, wherein both the upper and lower heating elements are simultaneously activated during at least one of the plurality of stages.

8. The cooking appliance according to claim 6, wherein only one of the upper and lower heating elements is activated during at least one of the plurality of stages.

9. The cooking appliance according to claim 1, wherein a total number of the plurality of stages is dependent upon a volume of the cooking chamber.

10. The cooking appliance according to claim 1, wherein a heat output of the at least one heat source is at least 1270 watts per cubic foot of cooking chamber volume.

11. The cooking appliance according to claim 1, wherein the plurality of stages constitutes three distinct stages.

12. A cooking appliance incorporating a no preheat cooking mode comprising:

an oven cavity;

at least one heat source disposed to direct heat into said oven cavity;

a control panel including a plurality of input members for programming at least time and temperature parameters for a cooking operation within the oven cavity and for selectively establishing a no preheat cooking mode for the cooking appliance; and means for controlling said at least one heat source in accordance with a no preheat cooking sequence upon establishing the no preheat cooking mode, said controlling means being adapted to activate the at least one heat source at a maximum heat output for a first predetermined time period and at a varying heat output through a plurality of stages for a second time period, with said first and second time periods being collectively equal to the programmed time parameter.

13. The cooking appliance according to claim 12, wherein the plurality of input members includes a selector member dedicated for use in establishing the no preheat cooking mode.

14. The cooking appliance according to claim 13, wherein the controlling means completes the cooking operation in the programmed time parameter during the no preheat mode.

15. The cooking appliance according to claim 12, wherein said controlling means selectively operates said at least one heat source during at least a portion of each of the plurality of stages.

16. The cooking appliance according to claim 15, further comprising:

a plurality of heat sources, said controlling means selectively operating each of the plurality of heat sources during the first time period.

17. The cooking appliance according to claim 16, wherein the controlling means operates at least two of the plurality of heat sources during a majority of the plurality of stages.

18. The cooking appliance according to claim 15, wherein the at least one heat source includes an upper heating element and a lower heating element.

19. The cooking appliance according to claim 18, wherein both the upper and lower heating elements are simultaneously activated during at least one of the plurality of stages.

20. The cooking appliance according to claim 18, wherein only one of the upper and lower heating elements is activated during at least one of the plurality of stages.

21. The cooking appliance according to claim 12, wherein the plurality of stages constitutes three distinct stages.

22. In a cooking appliance including an oven cavity, a plurality of heat sources positioned to direct heat into said oven cavity, and a control panel having a plurality of input members for programming time and temperature parameters for a cooking operation within the oven cavity, a method of performing the cooking operation without preheating the oven cavity comprising:

A) setting a time parameter for a cooking operation, with the time parameter being based upon the cooking operation being performed with preheating of the oven cavity;

B) activating multiple ones of the plurality of heat sources at maximum heat outputs for a first time period of the cooking operation;

C) operating the cooking appliance through a plurality of managed heat generation stages for a second time period of the cooking operation, while individually controlling the plurality of heat sources; and D) completing a cooking operation in the programmed time parameter without initially preheating the cooking appliance.

23. The method of claim 22, further comprising: establishing a total number of the plurality of stages based upon a volume of the oven cavity.

24. The method of claim 22, further comprising: selecting the cooking operation without preheating of the oven cavity through a dedicated no preheat selector member provided on the control panel.

25. The method of claim 22, further comprising: operating a plurality of heat sources during a majority of the plurality of stages, said plurality of heat sources including a radiant heat source, a microwave heat source and a convection heat source.

26. The method of claim 25, further comprising: operating at least two of the plurality heat sources during at least one of the plurality of stages.

* * * * *